(12) United States Patent
Davis, Jr. et al.

(10) Patent No.: US 8,448,416 B2
(45) Date of Patent: May 28, 2013

(54) COMBUSTOR LINER

(75) Inventors: Lewis Berkley Davis, Jr., Niskayuna, NY (US); Ronald James Chila, Greer, SC (US)

(73) Assignee: General Electric Company, Schenectady, NY (US)

( * ) Notice: Subject to any disclaimer, the term of this patent is extended or adjusted under 35 U.S.C. 154(b) by 1094 days.

(21) Appl. No.: 12/414,003

(22) Filed: Mar. 30, 2009

(65) Prior Publication Data

US 2010/0242485 A1   Sep. 30, 2010

(51) Int. Cl.
*F23R 3/26* (2006.01)
*F02C 1/00* (2006.01)
*F23R 3/00* (2006.01)

(52) U.S. Cl.
CPC .. *F23R 3/26* (2013.01); *F23R 3/002* (2013.01)
USPC ............................... 60/39.23; 60/752; 60/760

(58) Field of Classification Search
USPC .................. 60/39.23, 752–760, 804
See application file for complete search history.

(56) References Cited

U.S. PATENT DOCUMENTS

| | | | |
|---|---|---|---|
| 3,652,181 A | 3/1972 | Wilhelm, Jr. | |
| 4,719,748 A | 1/1988 | Davis, Jr. et al. | |
| 4,944,152 A * | 7/1990 | Shekleton | 60/804 |
| 4,967,551 A * | 11/1990 | Faulkner | 60/804 |
| 5,509,270 A | 4/1996 | Pearce et al. | |
| 5,528,904 A * | 6/1996 | Jones et al. | 60/753 |
| 5,682,747 A | 11/1997 | Brown et al. | |
| 5,758,503 A | 6/1998 | DuBell et al. | |
| 5,758,504 A | 6/1998 | Abreu et al. | |
| 5,799,491 A * | 9/1998 | Bell et al. | 60/752 |
| 5,894,732 A | 4/1999 | Kwan | |
| 5,974,805 A | 11/1999 | Allen | |
| 6,408,628 B1 | 6/2002 | Pidcock et al. | |
| 6,546,627 B1 | 4/2003 | Sekihara et al. | |
| 6,571,560 B2 | 6/2003 | Tatsumi et al. | |
| 6,640,547 B2 | 11/2003 | Leahy, Jr. | |
| 6,675,586 B2 | 1/2004 | Maghon | |
| 6,701,714 B2 | 3/2004 | Burd et al. | |
| 6,792,757 B2 | 9/2004 | Borns et al. | |
| 6,810,673 B2 | 11/2004 | Snyder | |
| 6,938,424 B2 | 9/2005 | Tiemann | |
| 6,951,108 B2 * | 10/2005 | Burrus et al. | 60/746 |
| 7,093,439 B2 | 8/2006 | Pacheco-Tougas et al. | |
| 7,363,763 B2 | 4/2008 | Coughlan, III et al. | |
| 8,033,119 B2 | 10/2011 | Liang | |
| 2002/0056277 A1 | 5/2002 | Parry | |
| 2010/0229564 A1 | 9/2010 | Chila | |

* cited by examiner

*Primary Examiner* — Ehud Gartenberg
*Assistant Examiner* — Arun Goyal
(74) *Attorney, Agent, or Firm* — Cantor Colburn LLP

(57) ABSTRACT

A combustor within which a combustion zone is defined is provided and includes an annular liner having a first mixing hole defined therein at a first axial position, a flow sleeve, having a second mixing hole defined therein at a second axial position, the flow sleeve surrounding the liner to form a first flow space at an exterior of the liner, a port, coupled to the flow sleeve at the second axial position, which is configured to remove air from the first flow space via the second mixing hole, and a shield, having a third mixing hole defined therein at the second axial position, the shield being disposed to shield the liner and to form a second flow space within the liner, which is communicable with the combustion zone via the third mixing hole and with the first flow space via the first mixing hole.

16 Claims, 2 Drawing Sheets

COMBUSTOR LINER

BACKGROUND OF THE INVENTION

The subject matter disclosed herein relates to a combustor and, more particularly, a combustor with heat shielding.

A combustor is a component or area of a gas turbine, ramjet or pulse jet engine where combustion takes place. In a gas turbine engine, the main combustor or combustion chamber is fed high pressure air by an air compression system and feeds the hot exhaust into the turbine components of the gas generator. Combustors are designed to contain and control the burning fuel-air mixture. The combustor normally consists of three components: an outer casing that acts as a high pressure container, the combustion chamber itself which contains the flame and the fuel injection system.

Since the combustor experiences frequently high temperatures in its interior during normal operations, heat related damage to combustor components is a common failure mode.

BRIEF DESCRIPTION OF THE INVENTION

According to one aspect of the invention, a combustor within which a combustion zone is defined is provided and includes an annular liner having a first mixing hole defined therein at a first axial position, a flow sleeve, having a second mixing hole defined therein at a second axial position, the flow sleeve surrounding the liner to form a first flow space at an exterior of the liner, a port, coupled to the flow sleeve at the second axial position, which is configured to remove air from the first flow space via the second mixing hole, and a shield, having a third mixing hole defined therein at the second axial position, the shield being disposed to shield the liner and to form a second flow space within the liner, which is communicable with the combustion zone via the third mixing hole and with the first flow space via the first mixing hole.

According to another aspect of the invention, a can-annular combustor within which a combustion zone is defined is provided and includes an annular liner having a first mixing hole defined therein at a first axial position, a flow sleeve, having a second mixing hole defined therein at a second axial position, the flow sleeve surrounding the liner to form a first flow space at an exterior of the liner, a port, coupled to the flow sleeve at the second axial position, which is configured to remove air from the first flow space via the second mixing hole, and a shield, having a third mixing hole defined therein at the second axial position, the shield being disposed to shield the liner and to form a second flow space within the liner, which is communicable with the combustion zone via the third mixing hole and with the first flow space via the first mixing hole.

According to yet another aspect of the invention, a combustor shroud surrounding a combustion zone to which an air removing port is coupled is provided and includes a liner having a first mixing hole defined therein at a first axial position, a flow sleeve to form a first flow space relative to the liner, the flow sleeve having a second mixing hole defined therein at a second axial position aligned with that of the port and through which the port removes air from the first flow space, and a shield, having a third mixing hole defined therein at the second axial position, the shield being disposed to shield the liner and to form a second flow space relative to the liner, which is communicable with the combustion zone via the third mixing hole and with the first flow space via the first mixing hole.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
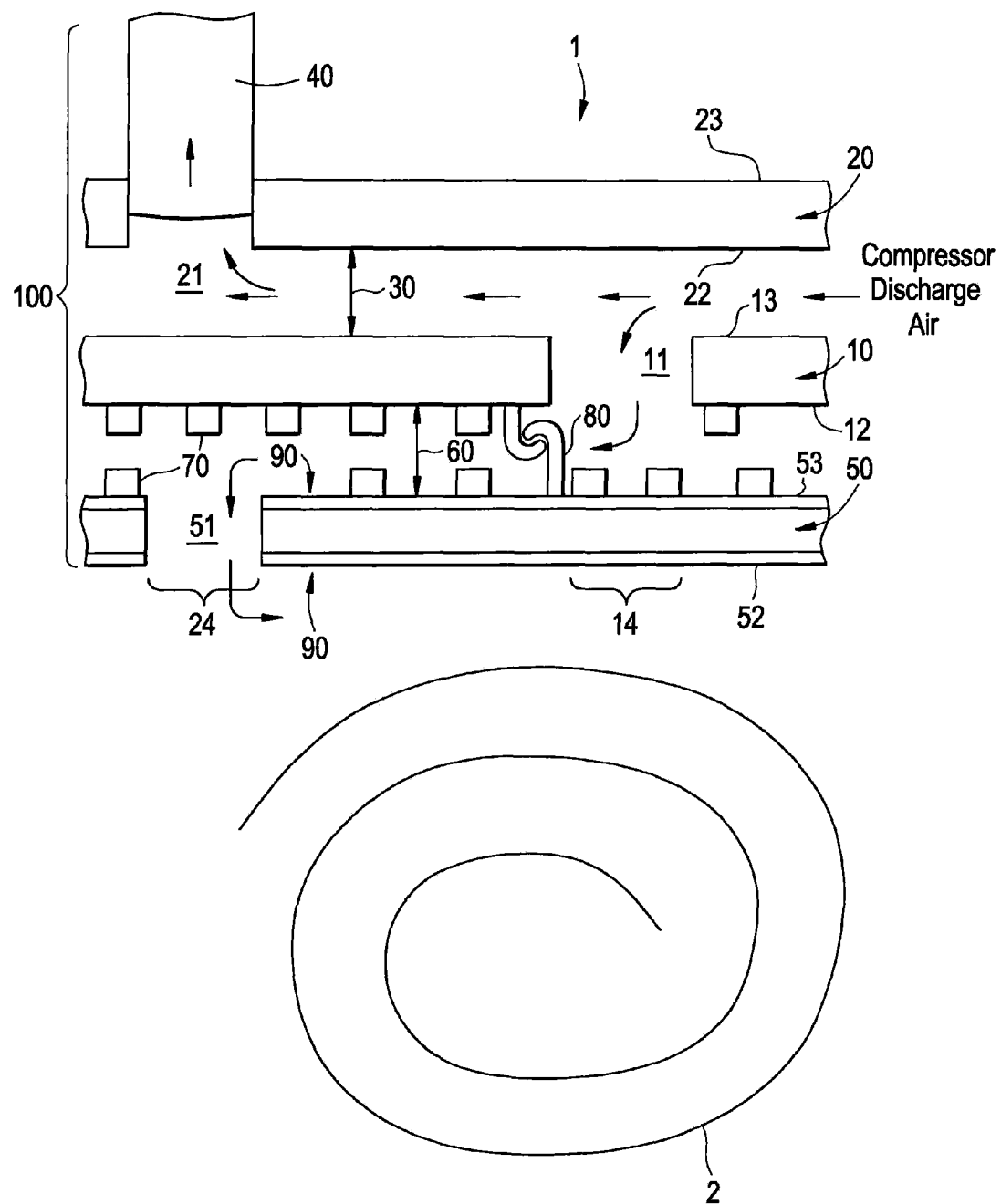
FIG. 1 is a sectional view of a combustor liner with a heat shield.
Figure 2:
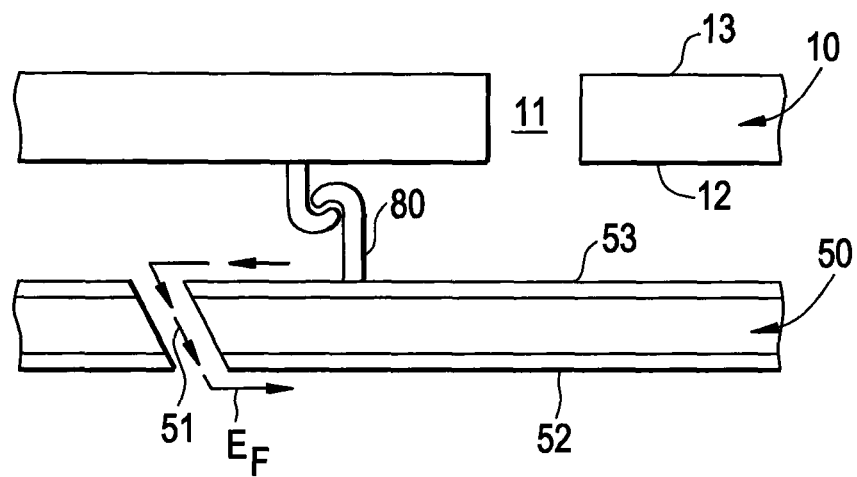
FIG. 2 is a sectional view of a combustor liner with a heat shield.
Figure 3:
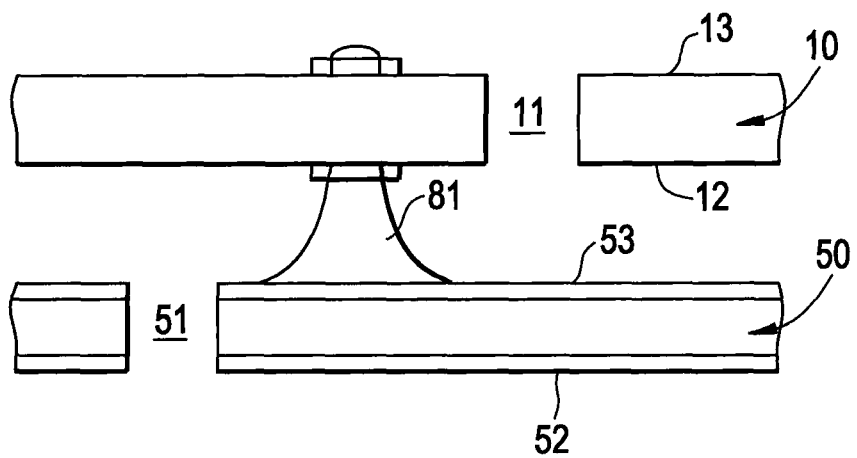
FIG. 3 is a sectional view of a combustor liner with a heat shield.

With reference to FIGS. 1-3, a combustor 1, such as a can-annular combustor, within which a combustion zone 2 is defined, is provided. The combustor 1 includes an annular liner 10, a flow sleeve 20, an air extraction port 40 and a heat shield 50.

The annular liner 10 is generally cylindrical or, in the case of a can-annular combustor, formed of a series of can shaped liners. In any case, the annular liner 10 is annular and surrounds the combustion zone 2. In this way, the annular liner 10 includes interior and exterior surfaces 12 and 13 and has a first mixing hole 11 defined therein, which extends from the interior surface 12 to the exterior surface 13. The first mixing hole 11 is located at a first axial position 14 of the combustor 1.

The flow sleeve 20 is shaped in a similar fashion as the annular liner 10 and, as such, includes interior and exterior surfaces 22 and 23 and has a second mixing hole 21 defined therein, which extends from the interior surface 22 to the exterior surface 23. The flow sleeve 20 generally surrounds the annular liner 10 and forms a first annular flow space 30 adjacent to the exterior surface 13. The first annular flow space 30 may be formed with varied dimensions and/or shapes. The second mixing hole 21 is located at a second axial position 24 of the combustor 1. It is to be understood that, while FIGS. 1-3 illustrate the second axial position 24 as being located upstream from the first axial position 14, this arrangement is merely exemplary and that embodiments exist in which the second axial position 24 is located downstream from the first axial position 14.

The air extraction port 40 is coupled to the flow sleeve 20 and extends in a substantially radial direction away from the exterior surface 23 of the flow sleeve 20. The air extraction port 40 is configured to remove, e.g., compressor discharge air from the first annular flow space 30 via the second mixing hole 21. To this end, the air extraction port 40 is disposed at an axial location that corresponds to the second axial position 24 and may be further disposed at a circumferential location that corresponds to that of the second mixing hole 21.

The heat shield 50 includes interior and exterior surfaces 52 and 53 and has a third mixing hole 51 defined therein that extends from the interior surface 52 to the exterior surface 53. The heat shield 50 is disposed within the interior surface 12 of the annular liner 10 to shield the interior surface 12 from combustion related damage occurring within the combustion zone 2. In this way, the heat shield 50 serves as a sacrificial component of the combustor 1 and, while the heat shield 50 may require relatively frequent service and/or replacement, such service and replacement would be less costly and time consuming than service and/or replacement of annular liner 10 components.

The heat shield 50 is further disposed to form a second annular flow space 60 within the liner 10 adjacent to the interior surface 12. The second annular flow space 60 is similar to the first annular flow space 30 in that it may be formed of varied dimensions and/or shapes. The second annular flow space 60 is disposed to be communicable with the combustion zone 2 via the third mixing hole 51 and with the first annular flow space 30 via the first mixing hole 11. The third mixing hole 51 is disposed at a location that corresponds to the second axial position 24.

The heat shield 50 may be a singular component or, in alternate embodiments, plural in number. Where the heat shield 50 is plural in number, individual shield members may be arranged substantially shoulder to shoulder with the third mixing hole 51 being defined within borders of individual shield members. Alternatively, the third mixing hole 51 may be defined within spaces provided in between the individual shield members.

The heat shield 50 may be formed of any suitable material composition including, but not limited to, ceramics and/or nickel alloy and may be formed by any suitable manufacturing processes. In addition, in accordance with embodiments, at least one of the liner 10 and the heat shield 50 may include a thermal barrier coating 90.

At least one of the liner 10, the flow sleeve 20 and the heat shield 50 may include protrusions 70 of varied dimensions and shapes that respectively protrude into the first and second annular flow spaces 30 and 60 to extend and span the effective sizes of the first and second annular flow spaces 30 and 60. In some embodiments, the protrusions 70 form cooling channels between the liner 10 and the flow sleeve 20 and between the liner 10 and the heat shield 50.

A fastening element, such as a hook 80, as shown in FIGS. 1 and 2, or a bolt and nut combination 81, as shown in FIG. 3, may be employed to suspend the heat shield 50 from the interior surface 12 of the liner 10. Of course, it is to be understood these fastening elements are merely exemplary and that further fastening elements may be employed to similar effect.

As is described above, with the first mixing hole 11 at the first axial position 14 and the second mixing hole 21, the port 40 and the third mixing hole 51 at the second axial position 24, compressor discharge air is removed by way of the air extraction port 40 from the first annular flow space 30.

As shown in FIGS. 1-3, the first, second and third mixing holes 11, 21 and 51 may have various dimensions and shapes. For example, the first mixing hole 11 may be oriented perpendicular to the axial direction of the combustor 1 while the third mixing hole 51 may be provided with an angled orientation. In this way, effusion flow $E_F$ from the third mixing hole 51 can be directed downstream through the combustion zone 2 and to hug the interior surface 52 of the heat shield 50 (see FIG. 2).

In accordance with another aspect, a combustor shroud 100 for use in, e.g., a can-annular combustor, is provided and surrounds a combustion zone 2. An air extraction port 40 is coupled to the combustor shroud 100 and the combustor shroud 100 includes an annular liner 10 having a first mixing hole 11 defined therein at a first axial position 14. A flow sleeve 20 forms a first annular flow space 30 relative to the annular liner 10. The flow sleeve 20 has a second mixing hole 21 defined therein at a second axial position 24, which is aligned with that of the air extraction port 40. The air extraction port 40 removes air from the first annular flow space 30 through the second mixing hole 21. A heat shield 50 has a third mixing hole 51 defined therein at the second axial position 24 and is disposed to shield the annular liner 10. The heat shield 50 is further disposed to form a second annular flow space 60 relative to the annular liner 10. The second annular flow space 60 is communicable with the combustion zone 2 via the third mixing hole 51 and with the first annular flow space 30 via the first mixing hole 11.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combustor within which a combustion zone is defined, comprising:
    an annular liner having a first mixing single hole defined therein at a first axial position;
    a flow sleeve, having a second mixing single hole defined therein at a second axial position, the flow sleeve surrounding the liner to form a first flow space at an exterior of the liner;
    a port, coupled to the flow sleeve at the second axial position, which is configured to remove air from the first flow space via the second mixing single hole;
    a shield, having a third mixing single hole defined therein at the second axial position, the shield being disposed to shield the liner and to form a second flow space within the liner, which is communicable with the combustion zone via the third mixing single hole and with the first flow space via the first mixing single hole; and
    wherein at least one of the liner and the shield comprises protrusions.

2. The combustor according to claim 1, further comprising a fastening element to couple the shield to the liner.

3. The combustor according to claim 1, wherein the shield is plural in number.

4. The combustor according to claim 1, wherein the shield comprises nickel alloy.

5. The combustor according to claim 1, wherein at least one of the liner and the shield comprises a thermal barrier coating.

6. A can-annular combustor within which a combustion zone is defined, comprising:
    an annular liner having a first mixing single hole defined therein at a first axial position;
    a flow sleeve, having a second mixing single hole defined therein at a second axial position, the flow sleeve surrounding the liner to form a first flow space at an exterior of the liner;
    a port, coupled to the flow sleeve at the second axial position, which is configured to remove air from the first flow space via the second mixing single hole;
    a shield, having a third mixing single hole defined therein at the second axial position, the shield being disposed to shield the liner and to form a second flow space within the liner, which is communicable with the combustion zone via the third mixing single hole and with the first flow space via the first mixing single hole; and wherein at least one of the liner and the shield comprises protrusions.

7. The can-annular combustor according to claim 6, further comprising a fastening element to couple the shield to the liner.

8. The can-annular combustor according to claim 6, wherein the shield is plural in number.

9. The can-annular combustor according to claim 6, wherein the shield comprises nickel alloy.

10. The can-annular combustor according to claim 6, wherein at least one of the liner and the shield comprises a thermal barrier coating.

11. A combustor shroud surrounding a combustion zone to which an air removing port is coupled, the combustor shroud, comprising:

a liner having a first mixing single hole defined therein at a first axial position;

a flow sleeve to form a first flow space relative to the liner, the flow sleeve having a second mixing single hole defined therein at a second axial position aligned with that of the port and through which the port removes air from the first flow space;

a shield, having a third mixing single hole defined therein at the second axial position, the shield being disposed to shield the liner and to form a second flow space relative to the liner, which is communicable with the combustion zone via the third mixing single hole and with the first flow space via the first mixing single hole; and wherein at least one of the liner and the shield comprises protrusions.

12. The combustor shroud according to claim 11, further comprising a fastening element to couple the shield to the liner.

13. The combustor shroud according to claim 11, wherein the shield is plural in number.

14. The combustor shroud according to claim 11, wherein the shield comprises nickel alloy.

15. The combustor shroud according to claim 11, wherein at least one of the liner and the shield comprises a thermal barrier coating.

16. The combustor shroud according to claim 11, wherein the combustor shroud is disposed within a can-annular combustor.

* * * * *